United States Patent [19]

Novak et al.

[11] 4,153,900
[45] May 8, 1979

[54] PHASE-CODED PULSE COMPRESSION TYPE PULSED ENERGY SYSTEM

[75] Inventors: Leslie M. Novak, Mission Viejo; Leslie Yen, Fullerton, both of Calif.

[73] Assignee: Rockwell International Corporation, El Segundo, Calif.

[21] Appl. No.: 692,054

[22] Filed: Dec. 20, 1967

[51] Int. Cl.$^2$ .............................................. G01S 9/233
[52] U.S. Cl. ........................................... 343/17.2 PC
[58] Field of Search .................. 343/17.2 PC, 17.2 R, 343/100 CL

[56] References Cited

U.S. PATENT DOCUMENTS

| | | | |
|---|---|---|---|
| 3,663,935 | 5/1972 | MacMullen | 343/17.2 PC X |
| 3,715,753 | 2/1973 | Applebaum et al. | 343/17.2 PC |
| 3,955,197 | 5/1976 | Gutleber et al. | 343/17.2 PC |

*Primary Examiner*—T. H. Tubbesing
*Attorney, Agent, or Firm*—L. Lee Humphries; H. Frederick Hamann; Rolf M. Pitts

[57] ABSTRACT

In a binary phase-coded pulse compression type pulsed energy system, means for synchronously transmitting two separately binary coded signals, the code for each signal having an autocorrelation function exhibiting a maximum synchronously occurring with that of the other coded signal, the two autocorrelation functions, when combined, being mutually cancelling except at the synchronous occurrence of the maxima of the autocorrelation functions.

20 Claims, 6 Drawing Figures

INVENTORS
LESLIE M. NOVAK
LESLIE YEN
BY
Roy M. Pitts

PHASE-CODED PULSE COMPRESSION TYPE PULSED ENERGY SYSTEM

CROSS-REFERENCES TO RELATED APPLICATIONS

U.S. application Ser. No. 474,821 filed July 26, 1965, by James A. Moulton for Phase Coded Pulse Compression Apparatus, now U.S. Pat. No. 3,757,331.

U.S. application Ser. No. 476,630 filed Aug. 2, 1965, by Carl R. Barrett, et al for Multiple Frequency Radar System Having Improved Response to Small Targets, now U.S. Pat. No. 3,745,578.

BACKGROUND OF THE INVENTION

In the design of conventional pulsed radar systems, the maximum range performance against targets of a preselected type is a function of the pulsed energy transmitted by such radar. As is well understood in the art, such pulsed energy is determined by the product of the transmitted power level and the pulsewidth thereof. Because a given radar transmitter design is usually peak-power limited, a desired energy requirement may be met, ofttimes, only by increasing the pulsewidth or duration of the transmitted pulse. While an increase in the pulsewidth of a given power level increases the maximum range performance of the radar, such pulsewidth increase also limits the range resolution or accuracy to which a range measurement may be made: the larger the pulsewidth, the larger the range resolution or error in the range determination (indicated as the product of pulsewidth and propagation velocity).

Several techniques have been studied for improving the range resolution effect associated with a selected pulsewidth. Such techniques are referred to in the art as pulse compression techniques, and involve means of operating a radar with long pulses to obtain the resolution and accuracy of a short pulse while retaining maximum range or detection capability of a long pulse. By means of such techniques, the transmitted energy pulse is selectively modulated and the receiver is designed to respond to such modulation to compress the received pulse into one of a much shorter pulsewidth.

One such pulse compression technique is referred to as phase-coded pulse compression, in which a long pulse having a preselected duration or pulsewidth is divided into an integer number of subpulses of uniform interval or duration, each interval referred to herein as a bit. The phase of each subpulse interval or bit is then either left unchanged or else reversed in phase by 180° prior to transmission, in accordance with the corresponding position of such bit in a preselected binary code or sequence. Upon reception of the echoes of the phase-coded pulses, the radar receiver reverse-codes the phase-coded waveform and combines the several bit or subpulse intervals thereof, the response to a discrete target (having a radial extent less than that represented by the transmitted pulsewidth) appearing as a high energy return having a compressed pulsewidth.

A discussion, including a full bibliography of phase-coded pulse compression techniques and the selection of optimum coding is provided at pages 497 and 498 of "Introduction to Radar Systems" by Skolnik, published by McGraw-Hill (1962). A particular embodiment of such technique is also taught in copending U.S. application Ser. No. 474,821 filed July 26, 1965, for Phase Coded Pulse Compression Apparatus, by James A. Moulton, assignor to North American Aviation, Inc., whose name has been subsequently changed to North American Rockwell Corporation, assignee of the subject invention.

Such pulse compression techniques, conventionally employing a single pulse compression code, provide a single autocorrelation function having distinct sidelobes. In other words, the non-zero autocorrelation coefficient provided at other than the maximum coefficient (or point of "signal compression") represents a theoretical performance limit which a physical embodiment may approach but cannot exceed.

SUMMARY OF THE INVENTION

By means of the concept of the subject invention, complimentary dual codes are employed, which avoid the above-noted theoretical performance limitations of the prior art and the combined autocorrelation functions for which provide a null sidelobe.

In a preferred embodiment of the inventive concept, there is provided a binary phase coded pulse compression type pulsed energy system, including means for synchronously transmitting two separately binary coded signals. The code for each signal has an autocorrelation function exhibiting a maximum, synchronously occurring with that of the other coded signal, the two correlation functions, when combined, being mutually cancelling except at the synchronous occurrence of the maxima of such autocorrelation functions. There is further provided receiver-decoding means comprising first and second phase decoder means, each responsive to a mutually exclusive one of the phase codes employed by the transmitting means for providing a first and second autocorrelated output. Signal combining means responsively coupled to the two decoders provides a receiver output signal.

By means of the above-described arrangement, the combination of the mutually complimentary autocorrelation functions at the decoder output provides a pulse compressed signal output which corresponds to an autocorrelation function having zero sidelobes. Accordingly, it is an object of the subject invention to provide an improved pulse compression type pulsed energy system.

It is another object of the invention to provide a phase-coded pulse compression type system for which the autocorrelation function has a theoretical sidelobe level of zero.

It is a further object to provide a phase coded pulse compression system employing two mutually complimentary and synchronous binary coded signals, the combination of the autocorrelation functions for which provides a null except at the pulse compression point.

These and further objects of the invention will become apparent from the following description taken together with the accompanying drawings, in which:

BRIEF DESCRIPTION OF THE DRAWINGS

In the figures, like reference characters refer to like parts.

DESCRIPTION OF THE PREFERRED EMBODIMENTS

Figure 1:
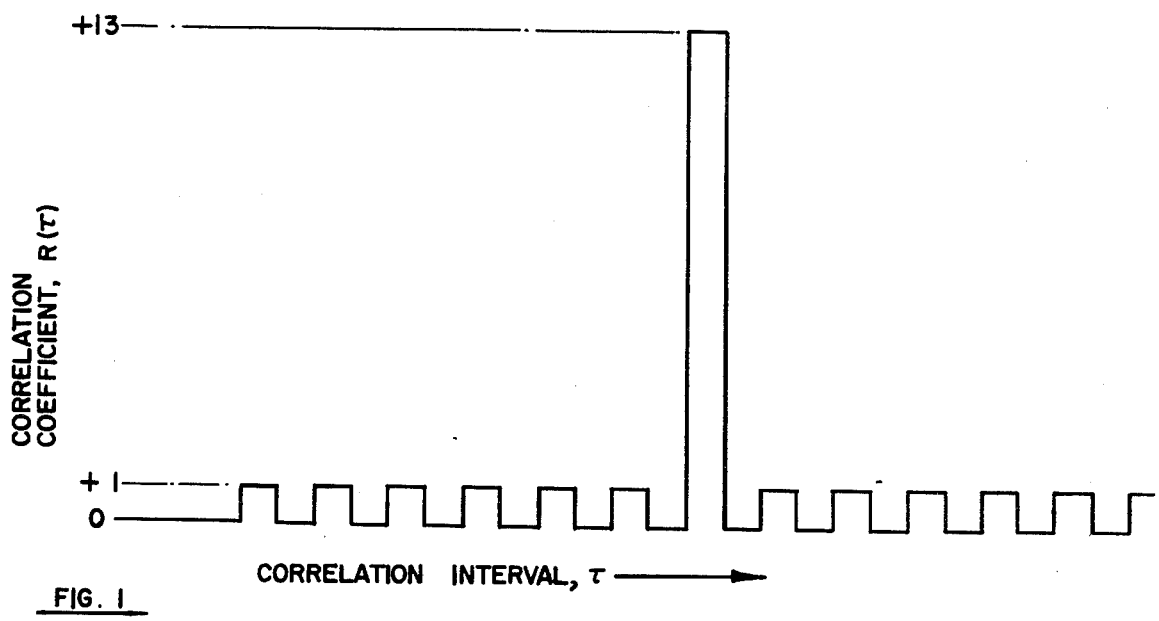
FIG. 1 is a representation of the autocorrelation function of an exemplary 13-bit Barker code of the prior art, showing the distinct side lobes therof about the point of maximum pulse compression.

Referring now to FIG. 1, there is illustrated a representation of the autocorrelation function of an exemplary 13-bit Barker code as employed, for example, in copending U.S. patent application Ser. No. 474,821 filed July 26, 1965, by James A. Moulton, assignor to North American Aviation, Inc., whose name has been subsequently changed to North American Rockwell Corporation, assignee of the subject invention. Such autocorrelation function represents the reverse coding of a receiver-decoder operating upon received echoes of a transmitted 13-bit binary phase code: $+++++--++-+-+$, as illustrated in the following tabulation:

Table 1.

| + | + | + | + | + | − | − | + | + | − | + | − | + |   |   |   |   |   |   |   |   |   |   |   |   |
|---|---|---|---|---|---|---|---|---|---|---|---|---|---|---|---|---|---|---|---|---|---|---|---|---|
|   | − | − | − | − | + | − | − | + | + | − | + | − | + |   |   |   |   |   |   |   |   |   |   |   |
|   |   | + | + | + | + | + | − | − | + | + | − | + | − | + |   |   |   |   |   |   |   |   |   |   |
|   |   |   | − | − | − | − | + | − | − | + | + | − | + | − | + |   |   |   |   |   |   |   |   |   |
|   |   |   |   | + | + | + | + | + | − | − | + | + | − | + | − | + |   |   |   |   |   |   |   |   |
|   |   |   |   |   | + | + | + | + | + | − | − | + | + | − | + | − | + |   |   |   |   |   |   |   |
|   |   |   |   |   |   | − | − | − | − | + | − | − | + | + | − | + | − | + |   |   |   |   |   |   |
|   |   |   |   |   |   |   | − | − | − | − | + | − | − | + | + | − | + | − | + |   |   |   |   |   |
|   |   |   |   |   |   |   |   | + | + | + | + | + | − | − | + | + | − | + | − | + |   |   |   |   |
|   |   |   |   |   |   |   |   |   | + | + | + | + | + | − | − | + | + | − | + | − | + |   |   |   |
|   |   |   |   |   |   |   |   |   |   | + | + | + | + | + | − | − | + | + | − | + | − | + |   |   |
|   |   |   |   |   |   |   |   |   |   |   | + | + | + | + | + | − | − | + | + | − | + | − | + |   |
|   |   |   |   |   |   |   |   |   |   |   |   | + | + | + | + | + | − | − | + | + | − | + | − | + |
| +1 | 0 | +1 | 0 | +1 | 0 | +1 | 0 | +1 | 0 | +1 | 0 | +13 | 0 | +1 | 0 | +1 | 0 | +1 | 0 | +1 | 0 | +1 | 0 | +1 |

Although the resultant theoretical signal compression is 13:1, there is a distinct side lobe level present at points of time other than that at which maximum signal compression occurs. Thus, although the echo return from a discrete target of interest and having a radial extent no greater than that corresponding to one code bit, is greatly enhanced by such pulse compression technique, it is possible that the unenhanced clutter background (amid which the target is located) may yet provide a sufficient response as to tend to obscure such target. In other words, a low side lobe level of the autocorrelation function, coupled with a sufficiently high clutter level may be difficult to distinguish from the pulse compressed output for a low-energy level discrete target signal.

Figure 3:
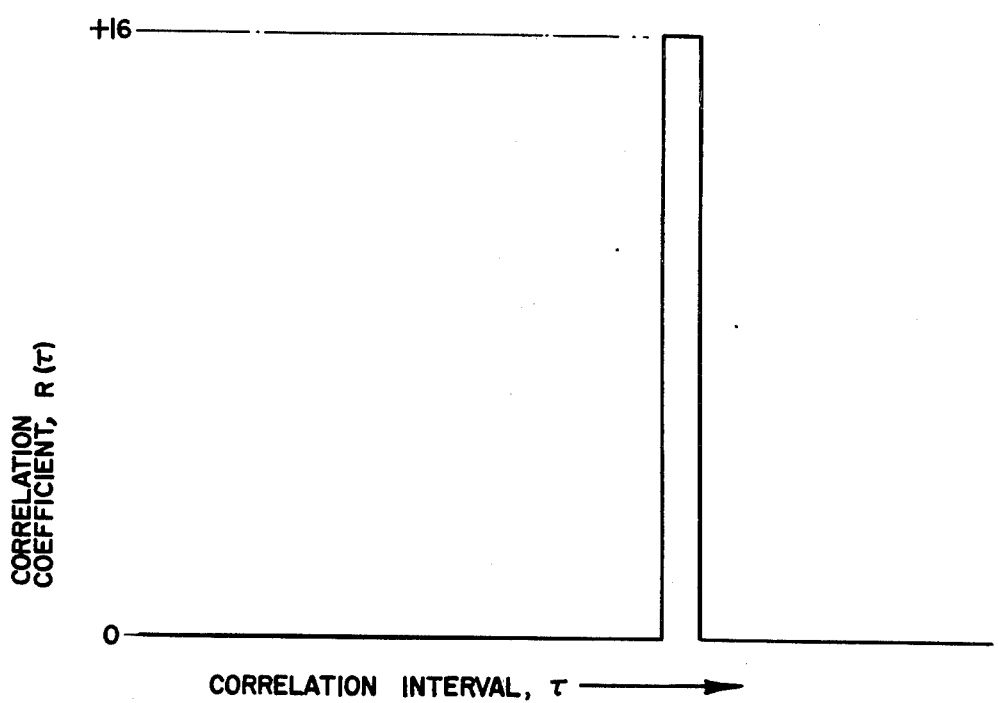
FIG. 3 is a representation of the combination or sum of the two autocorrelation functions of FIGS. 2A and 2B, as practiced by the concept of the invention.

By means of dual complimentary codes, having selectively matched autocorrelation functions, a combined function having no sidelobes may be obtained, corresponding to the representative function illustrated in FIG. 3. For example, a first eight-bit binary code, $---+++-+$, and a second eight-bit binary code, $---+--+-$, may be employed to respectively code a respective one of two simultaneous signals or carrier frequencies. Decoding of the first code by a corresponding decoder results in a first autocorrelation function, indicated in Table 2 and illustrated in FIG. 2A:

Table 2.

| − | − | − | + | + | + | − | + |   |   |   |   |   |   |   |
|---|---|---|---|---|---|---|---|---|---|---|---|---|---|---|
|   | + | + | + | − | − | − | + | − |   |   |   |   |   |   |
|   |   | − | − | − | + | + | + | − | + |   |   |   |   |   |
|   |   |   | − | − | − | + | + | + | − | + |   |   |   |   |
|   |   |   |   | − | − | − | + | + | + | − | + |   |   |   |
|   |   |   |   |   | + | + | + | − | − | − | + | − |   |   |
|   |   |   |   |   |   | + | + | + | − | − | − | + | − |   |
|   |   |   |   |   |   |   | + | + | + | − | − | − | + | − |
| −1 | 0 | −1 | 0 | −3 | 0 | +1 | +8 | +1 | 0 | −3 | 0 | −1 | 0 | −1 |

Figure 2A:
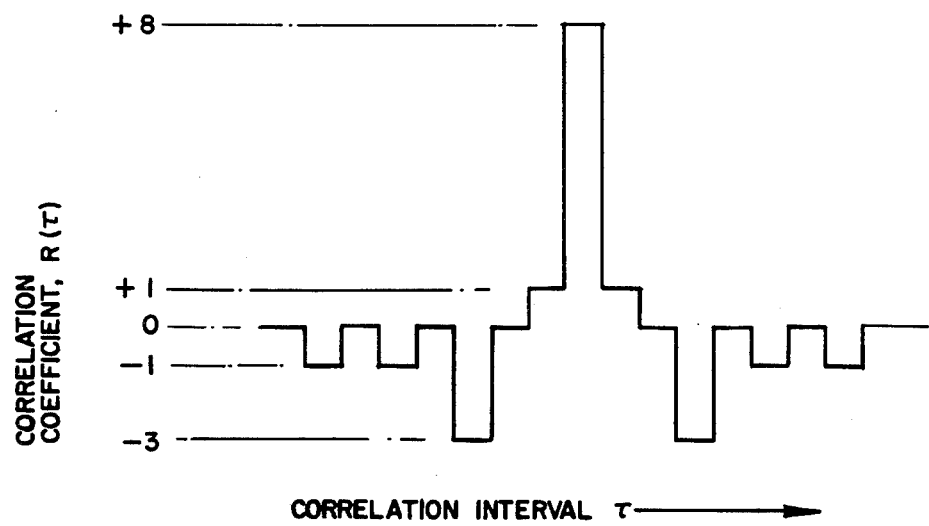
FIGS. 2A and 2B are representations of a pair of autocorrelation functions for a representative pair of eight-bit codes, as employed by the concept of the invention.
Figure 2B:
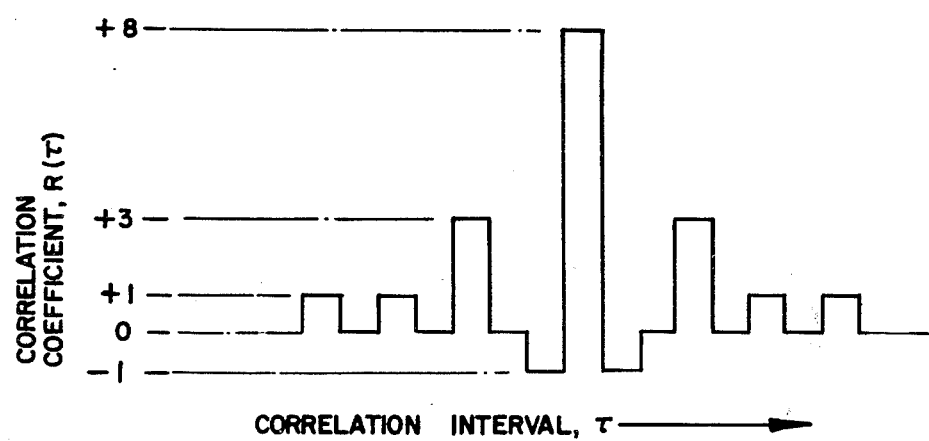

Decoding of the second code by a corresponding decoder results in a second autocorrelation function, indicated in Table 3 and illustrated in FIG. 2B:

Table 3.

| + | + | + | − | + | + | − | + |   |   |   |   |   |   |   |
|---|---|---|---|---|---|---|---|---|---|---|---|---|---|---|
|   | − | − | − | + | − | − | + | − |   |   |   |   |   |   |
|   |   | + | + | + | − | + | + | − | + |   |   |   |   |   |
|   |   |   | + | + | + | − | + | + | − | + |   |   |   |   |
|   |   |   |   | − | − | − | + | − | − | + | − |   |   |   |
|   |   |   |   |   | + | + | + | − | + | + | − | + |   |   |
|   |   |   |   |   |   | + | + | + | − | + | + | − | + |   |
|   |   |   |   |   |   |   | + | + | + | − | + | + | − | + |
| +1 | 0 | +1 | 0 | +3 | 0 | −1 | +8 | −1 | 0 | +3 | 0 | +1 | 0 | +1 |

It is to be observed from a comparison of FIGS. 2A and 2B that each of the two autocorrelation functions has a maximum occurring at the same bit-time and having the same phase sense as that of the other function, and that the sidelobes of each are of like shape and amplitude but of opposite sense, relative to the other function. Accordingly, it is to be appreciated that by summing or combining the decoded results or two complimentary autocorrelation functions that a function having a single maximum and no side lobes may be obtained, corresponding to the illustrated function of FIG. 3 and the tabulation in Table 4:

Table 4.

| -1 | 0 | -1 | 0 | -3 | 0 | +1 | +8 | +1 | 0 | -3 | 0 | -1 | 0 | -1 |
|---|---|---|---|---|---|---|---|---|---|---|---|---|---|---|
| +1 | 0 | +1 | 0 | +3 | 0 | -1 | +8 | -1 | 0 | +3 | 0 | +1 | 0 | +1 |
| 0 | 0 | 0 | 0 | 0 | 0 | 0 | 16 | 0 | 0 | 0 | 0 | 0 | 0 | 0 |

In other words, such dual eight-bit codes provide a result corresponding to a pulse compression of 16:1 without any side lobe, as distinguished from the illustrated result for a 13-bit Barker code.

Although the result has been illustrated for dual codes having eight bits each, other codes may be used, it merely being necessary that the like word size or like number of bits in each binary code of the code pair correspond to an even number which is the sum of two squares (2, 4, 8, 10, 16, 18, etc.). Theoretical considerations of binary coding arrangements, generally, may be found in the February 1967 issue of *Microwave Journal*, in an article at pages 67—67, entitled "Pulse Sequences with Good Autocorrelation Properties," by R. Pettit; and in the April 1961 issue of the *I.R.E. Transactions on Information Theory* in an article at pages 82–87, entitled "Complimentary Series" by M. Golay.

Figure 4:
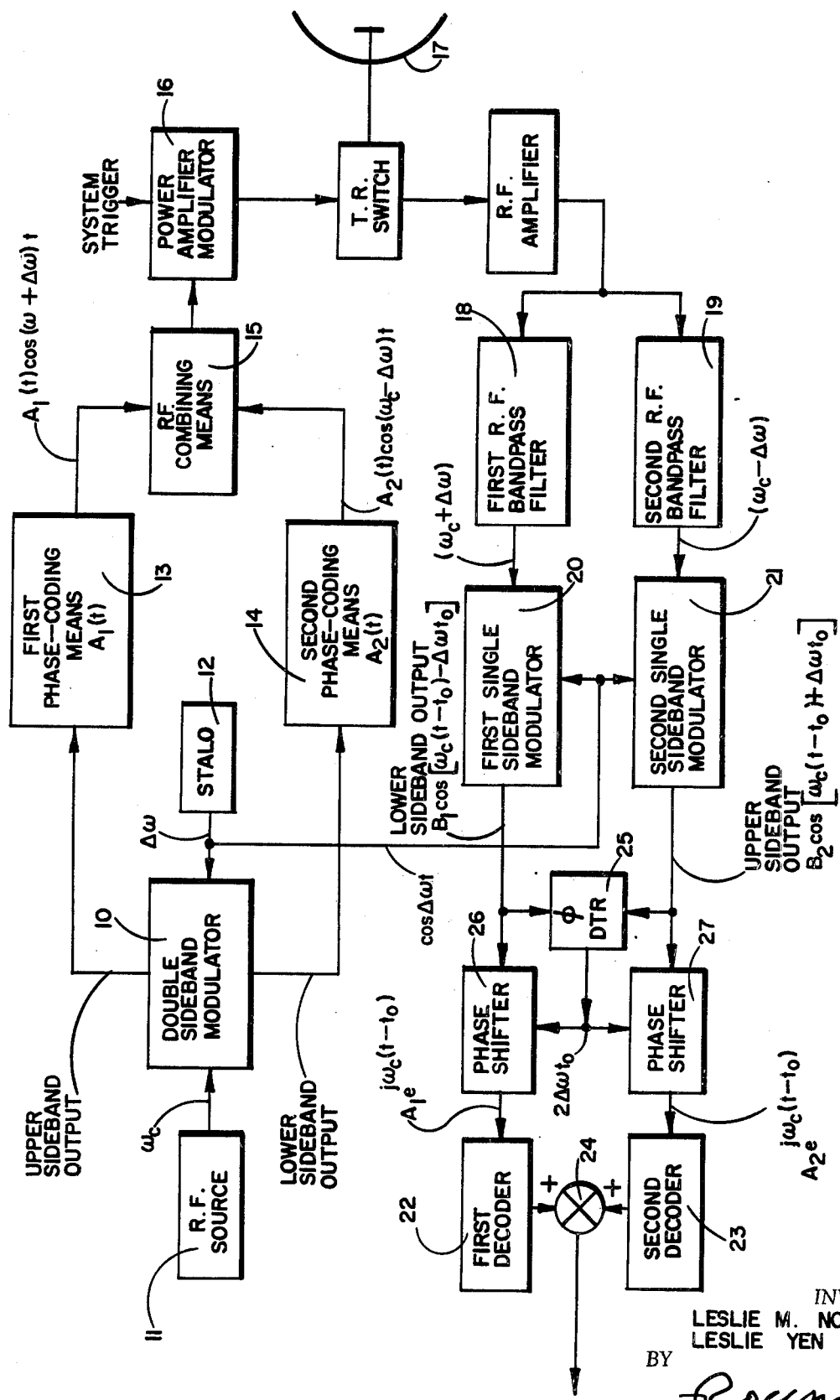
FIG. 4 is a block diagram of a system embodying the concept of the invention.

Referring now to FIG. 4, there is illustrated a block diagram of a system embodying the concept of the invention. There is provided a double sideband modulator 10 having a first and second input coupled to a respective source 11 of a first carrier frequency $\omega_c$ and a source 12 of a coding frequency, $\Delta\omega$, for providing a respective upper and lower sideband output corresponding to a respective second and third carrier frequency. First and seconding binary phase coding means 13 and 14 respectively phase-code a respective one of the outputs of modulator 10 with a complementary one of dual binary phase codes, as described above in connection with Tables 2 and 3. Broadband signal combining means 15, responsively connected to the coded outputs of coding means 13 and 14, feeds the coded second and third carriers to a power amplifier modulator 16 for pulsed transmission via an antenna 17. In other words, such transmitting arrangement comprises means for synchronously transmitting two selectively matched phase-coded pulsed carrier frequencies, the phase code of each frequency being the compliment of the other.

The construction and arrangement of elements 10, 11, 12, 13, 14, 15, 16 and 17 are well understood in the art, as indicated by the abovecited text by Skolnik and U.S. patent application Ser. No. 474,821 filed July 26, 1965. Therefore, these elements are shown in block form only for convenience in exposition.

There is also provided in the arrangement of FIG. 4 a two-channel receiver-decoder having a first and second channel responsive to a respective one of the two transmitted carrier frequencies, and comprising a first and second RF bandpass filter 18 and 19. First and second single sideband modulators 20 and 21, each having a modulation input coupled to coding frequency source 12, are employed to frequency translate received echoes of the transmitted coded carriers for providing a first and second receiver output of like frequency, $\omega_c$, as that of RF source 11. For example, a lower sideband demodulator 20 strips the upper sideband component from received echoes of the coded upper sideband transmitted signal, while an upper sideband modulator 21 strips the lower sideband component from received echoes of the lower sideband transmitted signal. The construction and arrangement of RF bandpass filters 18 and 19 and single sideband modulators 20 and 21 are well known in the art, as indicated for example in U.S. Pat. No. 3,310,802 issued Mar. 21, 1967, to D. D. Coleman, et al, for a Data Link System. Therefore, such elements are shown in FIG. 4 in block form only.

A first decoder 22 and second decoder 23 are responsively coupled to a respective one of single sideband modulators 20 and 21 for pulse compression of that one of the binary phase-coded carrier to which such respective modulator output responds. In other words, where the output of first modulator 20 corresponds to that transmitted carrier which is coded by first coding means 13, then first decoder is arranged for pulse compression of that phase code $A_1(t)$ impressed by coding means 13 on upper sideband carrier $(\omega_c + \Delta\omega)$, while second decoder 23 provides pulse compression of that phase code $A_2(t)$ impressed by second coding means 14 on lower sideband carrier $(\omega_c - \Delta\omega)$. The pulse compressed outputs of decoders 22 and 23 are combined by signal summing means 24, corresponding to the operation indicated by Table 4 and represented by FIG. 3.

The construction and arrangement of decoders for phase-coded pulse compression systems are well understood in the art, as indicated from the above-noted text by Skolnik and U.S. application Ser. No. 474,821 filed July 26, 1965; accordingly, decoders 22 and 23 are shown in block form only.

Figure 5:
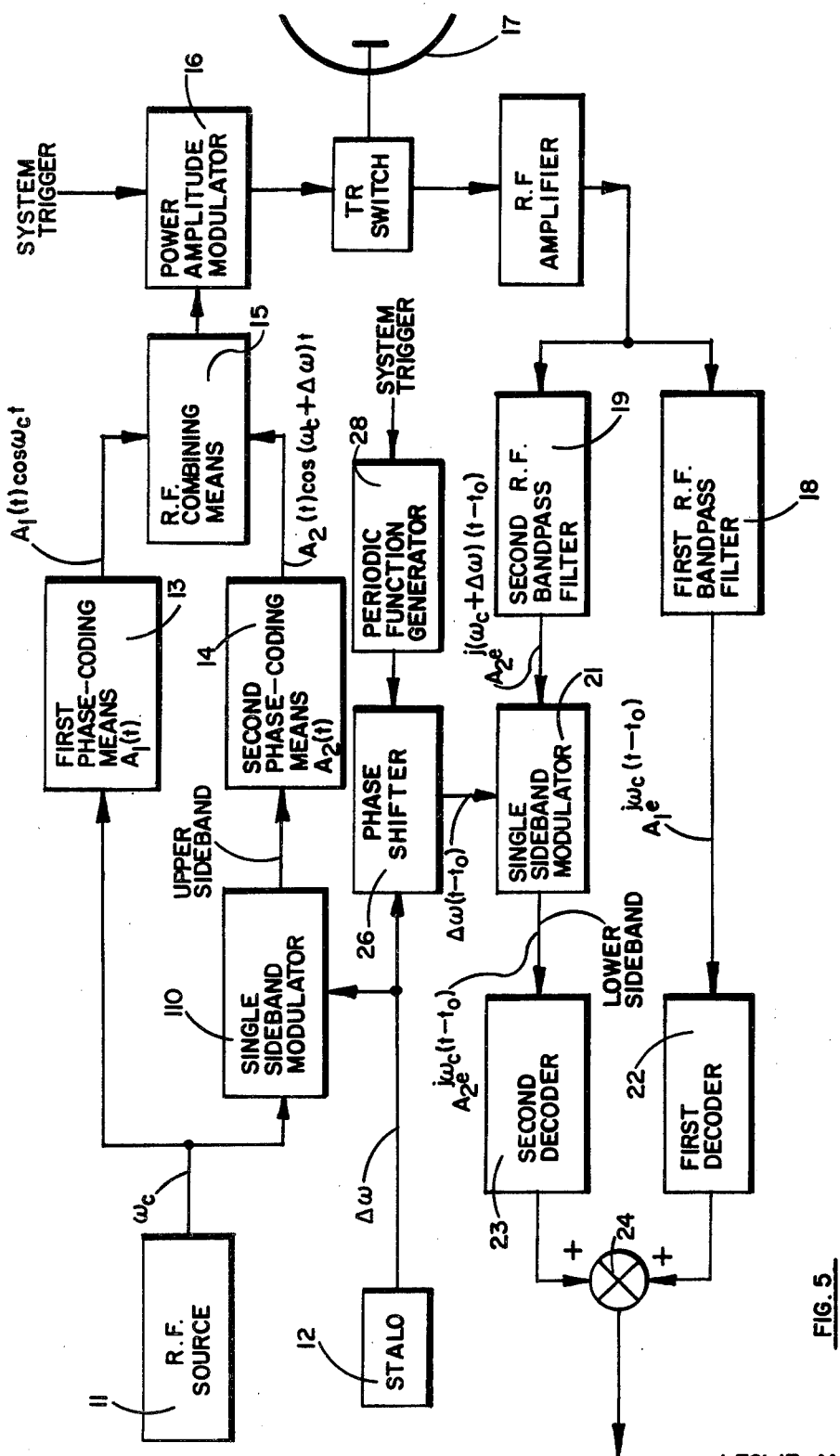
FIG. 5 is a block diagram of a preferred alternative embodiment of the inventive concept.

The double sideband modulation of the carrier source 11 to provide two carriers for separate coding, and the associated single sideband demodulation of two receiver signals, may be avoided by the arrangement of FIG. 5.

Referring to FIG. 5, there is illustrated, in block diagram form, an alternate embodiment of the arrangement of FIG. 4 in which only one sideband output of a sideband modulator 110 is employed in the coded transmitting means. In other words, second phase-coder 14 is connected to an upper sideband output of modulator 110, but the input of first coder 13 is coupled to the output of RF source 11. Thus, the carrier frequency difference between the two coded carrier outputs of coders 13 and 14 is $\Delta\omega$, rather than $2\Delta\omega$. Correspondingly, the receiver-decoder means of FIG. 5 requires only one single sideband modulator for frequency translating one of the two receiver outputs to the carrier frequency of the other. For example, first bandpass filter 18 has a center frequency corresponding to the transmitted first carrier frequency $\omega_c$, while second filter 19 has a center frequency corresponding to the second carrier frequency $(\omega_c + \Delta\omega)$. Hence, lower sideband modulator 21, interposed between the output of second receiver filter 19 and second decoder 23 and responsively connected to frequency source 12, translates the carrier frequency of the input of decoder 23 to that of the input to decoder 22.

In the two arrangements of FIGS. 4 and 5, the two carriers as transmitted are mutually coherent, having been developed from a common carrier source 11, as is more fully discussed in copending U.S. patent application Ser. No. 476,630 filed Aug. 2, 1965, by Carl R. Barrett, et al, assignors to North American Aviation, Inc., (whose name has been subsequently changed to North American Rockwell Corporation, assignee of the subject invention). However, in view of the range-time difference ($\Delta t_i$) between the occurrence of that coding frequency sample from element 12, used in generation of at least one of the carrier frequency signals received by the receiver decoder, and that sample from element 12 used for frequency translation of at least one of the receiver signals, a phase-shift is introduced in the receiver frequency translation (single sideband demodulation) process. Therefore, it is preferrable to include phase compensation as a function of range-time ($\Delta t_i$) in each of the illustrated embodiments of FIGS. 4 and 5.

For example, in FIG. 4, the $\omega_c$ carrier frequency output of lower sideband modulator 20 includes a phase shift term, $-\Delta\omega\Delta t_i$, and the $\omega_c$ carrier frequency output of upper sideband modulator 21 includes a phase shift term, $+\Delta\omega\Delta t_i$, corresponding to a phase angle difference between such outputs of $2\Delta\omega\Delta t_i$. Such differential phase shift may be detected by a phase detector 25 and applied to voltage controlled phase shift means 26 and 27 for compensatory phase control of either one or both of the outputs of modulators 20 and 21, so as to restore or maintain a phase-coherent condition between such signals at all range-times over the range trace interval.

Because such compensation is predictable as a function of range time, an alternate phase compensation scheme may be employed, in which one merely compensatorily phase-shifts (as a function of range time) that coding frequency input ($\Delta\omega$) which is applied to the receiver frequency-translation means, as shown more particularly in FIG. 5. Such arrangement involves the use of only a single phase shifter 26 interposed between the output of coding frequency source 12 and the modulation input to the receiver frequency translation means (modulator 21 in FIG. 5 or modulators 21 and 22 in FIG. 4) and having a control input responsively coupled to a periodic function generator 28 or source of a periodic ramp function, corresponding to the linear phase compensation required ($\Delta\omega\Delta t_i$).

Hence, there has been described a phase-coded pulse compression system employing mutually complementary dual binary codes, and providing a response corresponding to an autocorrelation function having null-level sidelobes. Accordingly, an improved phase-coded pulse compression system is provided.

Although the invention has been illustrated and described in detail, it is to be clearly understood that the same is by way of limitation and example only and is not to be taken by way of limitation, the spirit and scope of this invention being limited only by the terms of the appended claims.

We claim:

1. In a phase-coded pulse-compression type pulsed energy system, dual code means for reducing the sidelobes of the autocorrelation function and comprising
    means for synchronously transmitting two phase-coded, pulsed carrier frequencies, the phase code of each frequency being the compliment of the other;
    receiver-decoder means responsive to said echoes of said two phase-coded frequencies for providing a combined pulse compression output signal.

2. The device of claim 1 in which said means for synchronously transmitting comprises first and second means for transmitting a respective first and second phase-coded pulsed carrier frequency, said carrier frequencies being mutually exclusive and the phase code of each frequency being the compliment of the other.

3. The device of claim 1 in which said receiver decoder means comprise
    first and second phase decoder means, each responsive to a mutually exclusive one of the phase codes employed by said means for transmitting for providing a respective first and second autocorrelated output; and
    signal combining means responsively coupled to said first and second phase-decoder means for providing a receiver output signal.

4. A phase-coded pulse compression type pulsed energy system, including a pulsed transmitter comprising
    first means for generating a first phase-coded pulsed carrier frequency; and
    second means for generating a second phase coded pulsed carrier frequency;
    said carrier frequencies being synchronously pulsed, and the phase-codes of said carrier frequencies being mutually complimentary.

5. The device of claim 4 in which there is further provided receiver-decoder means comprising
    first and second phase decoder means, each responsive to a mutually exclusive one of the phase codes employed by said means for transmitting for providing a respective first and second autocorrelated output; and
    signal combining means responsively coupled to said first and second phase-decoder means for providing a receiver output signal.

6. In a phase-coded pulse-compression type pulsed energy system, dual code means for reducing the sidelobes of the autocorrelation function and comprising
    means for synchronously transmitting two phase-coded, pulsed carrier frequencies, the binary phase code of each frequency being a like even number of bits corresponding to the sum of two squares, said codes being mutually complimentary;
    receiver-decoder means responsive to said echoes of said two phase-coded frequencies for providing a combined pulse compression output signal.

7. The device of claim 6 in which said receiver decoder means comprises
    first and second phase decoder means, each responsive to a mutually exclusive one of the phase codes employed by said means for transmitting for providing a respective first and second autocorrelated output; and
    signal combining means responsively coupled to said first and second phase-decoder means for providing a receiver output signal representing a combined autocorrelation function having reduced sidelobes.

8. A phase-coded pulse compression type pulsed energy system employing two binary codes of eight bits each, including a pulsed transmitter comprising
    first means for generating a first binary phase-coded pulsed carrier frequency, the code for which corresponds to the binary sequence, $-1, -1, -1, +1, +1, +1, -1, +1$; and
    second means for generating a second phase coded pulsed carrier frequency, the code for which corresponds to the binary sequence, $-1, -1, -1, +1, -1, -1, +1, -1,$
    said carrier frequencies being synchronously pulsed.

9. The device of claim 8 in which there is further provided receiver-decoder means comprising
    first and second phase decoder means, each responsive to a mutually exclusive one of the phase codes puts for pulse compression of frequency-translated received echoes of that one of the binary phase-coded carrier frequencies to which such respective receiver output responds; and decoder output combining means responsively coupled to an output of each of said decoding means.

20. The device of claim 18 in which said pulsed energy system further includes a two-channel receiver decoder having a first and second channel responsive to a respective one of said second and third carrier frequencies and comprising frequency translating means responsive to the difference between said second and third carrier frequencies for frequency translating received echoes of said second and third carrier frequencies for providing a first and second receiver output of like frequency;

first and second decoding means, each responsively connected to a respective one of the receiver outputs for pulse compression of frequency-translated received echoes of that one of the binary phase-coded carrier frequencies to which such respective receiver output responds;

decoder output combining means responsively coupled to an output of each of said decoding means; and compensatory phase shift means responsive to the phase shift between said two receiver outputs for cyclically varying the phase of at least one of them whereby a phase coherence between said receiver outputs is maintained over the system pulse repetition interval.

* * * * * employed by said means for transmitting for providing a respective first and second autocorrelated output; and signal combining means responsively coupled to said first and second phase-decoder means for providing a receiver output signal.

10. In a binary phase-coded pulse compression type pulsed energy system, means for synchronously transmitting two separately binary-coded signals, the code for each signal having an autocorrelation function exhibiting a maximum synchronously occurring with that of the other coded signal, the two autocorrelation functions, when combined, being mutually cancelling except at the synchronous occurrence of the maxima of said autocorrelation functions.

11. The device of claim 10 in which said transmitting means comprises
   a first and second source of a respective first and second carrier frequency;
   first and second phase-coding means for binary phase-coding a respective one of said carrier frequencies, and
   signal combining means for combining said first and second binary phase-coded carrier frequencies for transmission.

12. The device of claim 11 in which said pulsed energy system further includes a two-channel receiver-decoder having a first and second channel responsive to a respective one of said first and second carrier frequencies and comprising
   frequency translating means responsive to the frequency difference between said first and second carrier frequencies for frequency translation of the received echoes of at least one of said carrier frequencies for providing a first and second receiver output of like frequency;
   first and second decoding means, each responsively connected to a respective one of said receiver outputs for pulse compression of received echoes of that one of the binary phase coded carrier frequencies to which such respective receiver output responds; and
   decoder output combining means responsively coupled to an output of each of said decoding means.

13. The device of claim 12 in which said first and second carrier sources are mutually coherent and which said receiver-decoder includes phase shift means responsive to the phase shift between said received echoes of said two carrier frequencies received at each range-time for restoring mutual coherence therebetween prior to pulse-compression thereof by said decoding means.

14. The device of claim 10 in said transmitting comprises
   a source of a carrier frequency;
   a source of a coding frequency;
   frequency modulating means responsively coupled to said frequency sources for providing at least one of an upper and lower-sideband output;
   signal combining means having a first input responsive to said one sideband output of said frequency modulating means and further having a second input responsive to a preselected one of said carrier frequency source and a second sideband output of said frequency modulating means; and
   first and second binary phase coding means each interposed at a mutually exclusive one of said inputs of said signal combining means.

15. The device of claim 10 in said transmitting comprises
   a source of a first carrier frequency;
   a source of a coding frequency;
   frequency modulating means responsively coupled to said frequency sources for providing one of an upper and lower-sideband output as a second carrier frequency;
   signal combining means having a first input responsive to said sideband output of said frequency modulating means and further having a second input responsive to said carrier frequency source; and
   first and second binary phase coding means, each interposed at a mutually exclusive one of said inputs of said signal combining means.

16. The device of claim 15 in which said pulsed energy system further includes a two-channel receiver-decoder having a first and second channel responsive to a respective one of said first and second carrier frequencies and comprising
   frequency translating means responsive to said coding frequency for frequency translation of the received echoes of one of said carrier frequencies for providing a first and second receiver output of like frequency;
   first and second decoding means, each responsively connected to a respective one of said receiver outputs for pulse compression of received echoes of that one of the binary phase coded carrier frequencies to which such respective receiver output responds; and
   decoder output combining means responsively coupled to an output of each of said decoding means.

17. The device of claim 16 in which there is further provided compensatory phase shift means responsive to a system trigger of said pulsed energy system for cyclically varying the phase of said frequency translating means, whereby the coherence between said two receiver outputs is maintained over the system pulse repetition interval.

18. The device of claim 10 in which said transmitting means comprises
   a source of a first carrier frequency;
   a source of a coding frequency;
   frequency modulating means responsively coupled to said frequency sources for providing a respective upper and lower sideband output corresponding to a second and third carrier frequency;
   signal combining means having a first and second input and responsive to a respective one of said upper and lower sideband outputs of said frequency modulation means; and
   first and second binary phase coding means, each interposed at a mutually exclusive one of said inputs of said signal combining means.

19. The device of claim 18 in which said pulsed energy system further includes a two-channel receiver decoder having a first and second channel responsive to a respective one of said second and third carrier frequencies and comprising
   frequency translating means responsive to the difference between said second and third carrier frequencies for frequency translating received echoes of said second and third carrier frequencies for providing a first and second receiver output of like frequency;
   first and second decoding means, each responsively connected to a respective one of the receiver out-